(12) United States Patent
Cambrey

(10) Patent No.: US 8,304,680 B2
(45) Date of Patent: Nov. 6, 2012

(54) PORTABLE BORE WELDING MACHINE

(76) Inventor: Dennis Cambrey, Campbell River (CA)

( * ) Notice: Subject to any disclaimer, the term of this patent is extended or adjusted under 35 U.S.C. 154(b) by 520 days.

(21) Appl. No.: 12/573,113

(22) Filed: Oct. 3, 2009

(65) Prior Publication Data

US 2011/0079585 A1   Apr. 7, 2011

(51) Int. Cl.
*B23K 9/04*   (2006.01)
(52) U.S. Cl. .................. 219/76.14; 219/125.11
(58) Field of Classification Search ............... 219/76.14, 219/125.11, 136
See application file for complete search history.

(56) References Cited

U.S. PATENT DOCUMENTS

| | | | | |
|---|---|---|---|---|
| 6,284,995 B1 * | 9/2001 | Esslinger et al. | ........... | 219/76.14 |
| 6,448,531 B1 * | 9/2002 | Esslinger et al. | ........... | 219/76.14 |
| 6,653,589 B2 * | 11/2003 | Dolton et al. | ............... | 219/76.14 |
| 2008/0073328 A1 * | 3/2008 | Kossowan | ................... | 219/76.14 |
| 2011/0024394 A1 * | 2/2011 | Esslinger | ..................... | 219/76.1 |

* cited by examiner

*Primary Examiner* — Steven J Fulk
(74) *Attorney, Agent, or Firm* — Gordon Thomson

(57) ABSTRACT

A level entry bore welder that is easier to use and less expensive to purchase. It has an adjustable step feature that allows the operator to control the bead placement inside the bore of a work piece. It includes a simple remote control apparatus that adjusts the welding torch rotation speed as a function of the diameter of the bore. The remote control apparatus also permits the operator to turn the wire feed mechanism on and off. The welder is suited for bores up to 12 inches in diameter.

4 Claims, 5 Drawing Sheets

PORTABLE BORE WELDING MACHINE

FIELD OF THE INVENTION

This invention relates to the field of metal fusion bonding, and more particularly to gas metal arc welding and specifically to a portable bore welding machine.

BACKGROUND OF THE INVENTION

When a machined bore in a piece of equipment becomes worn due to high cyclic load, old age, lack of grease or some other factor, they become egg shaped or worn so they no longer function as intended. They can be economically repaired by building up the bore slightly undersize with weld and machining back to the proper diameter. For example, a machined bore in a heavy gear wheel may become so worn that the bearing within the bore no longer fits tightly within the bore and this can lead to machine failure. These pieces of equipment can be repaired by using a bore welding technique that adds material to the inside surface to build up the worn surface of the bore until it becomes undersized. A bore welder uses a rotating and stepping torch, along with the MIG process to build up the surface of a worn bore by depositing contiguous weld beads around the bore's circumference. Once the bore has been augmented, the piece is then re-bored to the proper size and the bearing can be reinserted. This operation can be performed in a workshop but is often performed in the field where swift repairs to critical equipment are necessary.

There are a variety of bore welding machines in the market place. These machines are priced into the tens of thousands of dollars making the possession of such equipment difficult for many small businesses. Therefore, there continues to be need for a lower cost "entry level" bore welder that possesses the automated features of larger machines such as an adjustable step feature.

SUMMARY OF THE INVENTION

The invention provides for a simple and reasonably priced portable bore welding machine for circular deposition of a weld bead on an inside surface of a bore. The machine includes a torch assembly comprising a torch head attached to a torch head extension tube. In one embodiment of the invention the torch head can swivel and the extension tube can swivel to be able to place the torch head in a desired position close to the inside surface of the bore of the work piece. In another embodiment of the invention only the extension tube can swivel. There is a motor assembly housed in a housing for moving the torch head on a worm gear linearly into the bore and rotationally around the circumference of inside surface of the bore. The welding apparatus includes a wire electrode feeding assembly and a remote controller connected to the apparatus by a cable. The remote controller is able to automatically adjust the rotational speed of the torch head as a function of bore diameter. The linear speed of the torch head into the bore is adjusted manually by the operator at a steady rate.

ADVANTAGES AND OBJECTIVES OF THE INVENTION

One objective of the present invention is to provide a portable bore welding machine that is relatively inexpensive for small machine shop owners.

One advantage of the present invention is that it can be used with any wire feeder.

Another advantage of the present invention is that it can be used with a variety of boring bars.

A further advantage of the present invention is that it can be used with or without a portable line boring machine.

DETAILED DESCRIPTION

Figure 1:
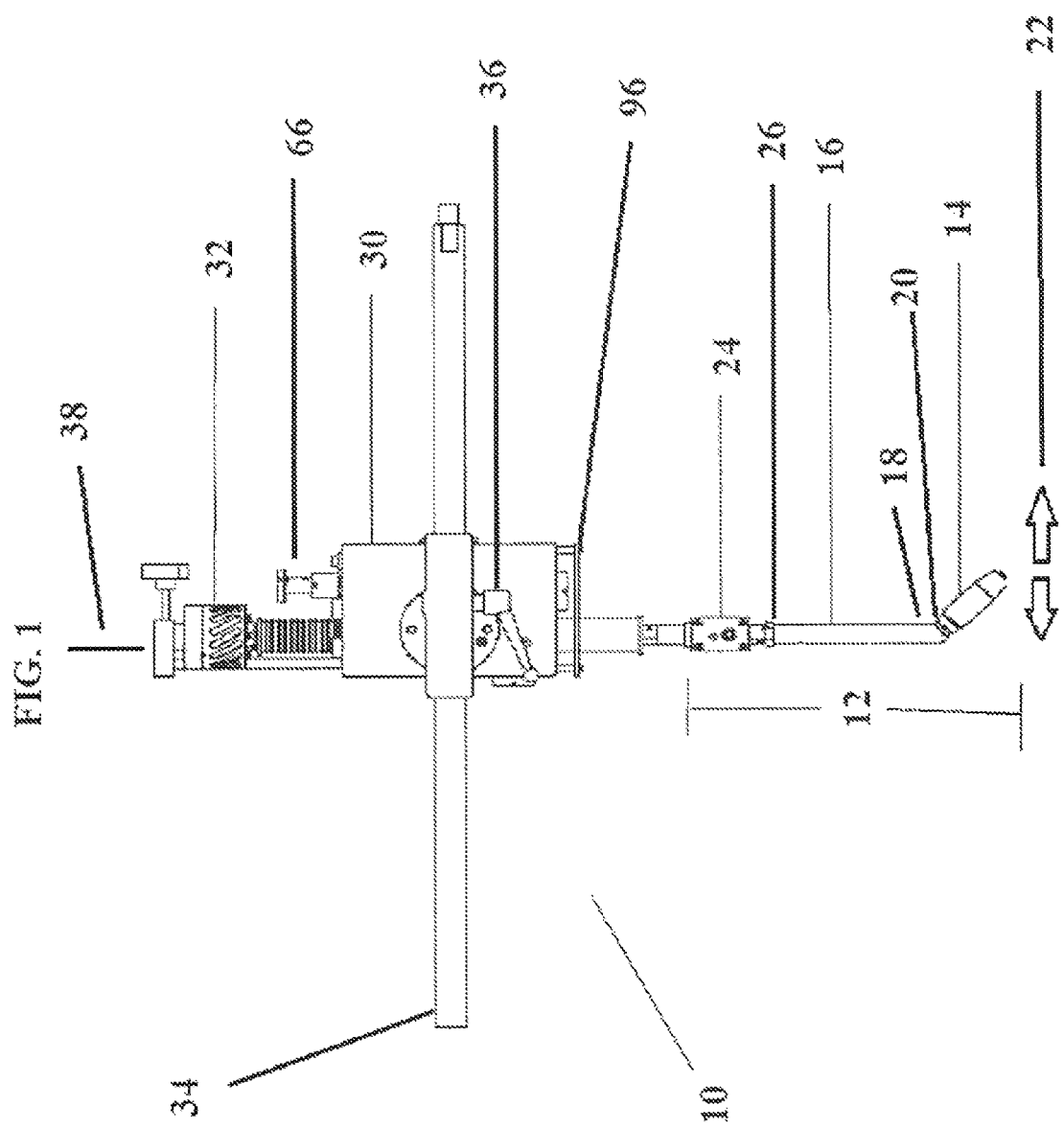
FIG. 1 is a side view of one embodiment of the invention without the feed assembly or electrical connection.
Figure 2:
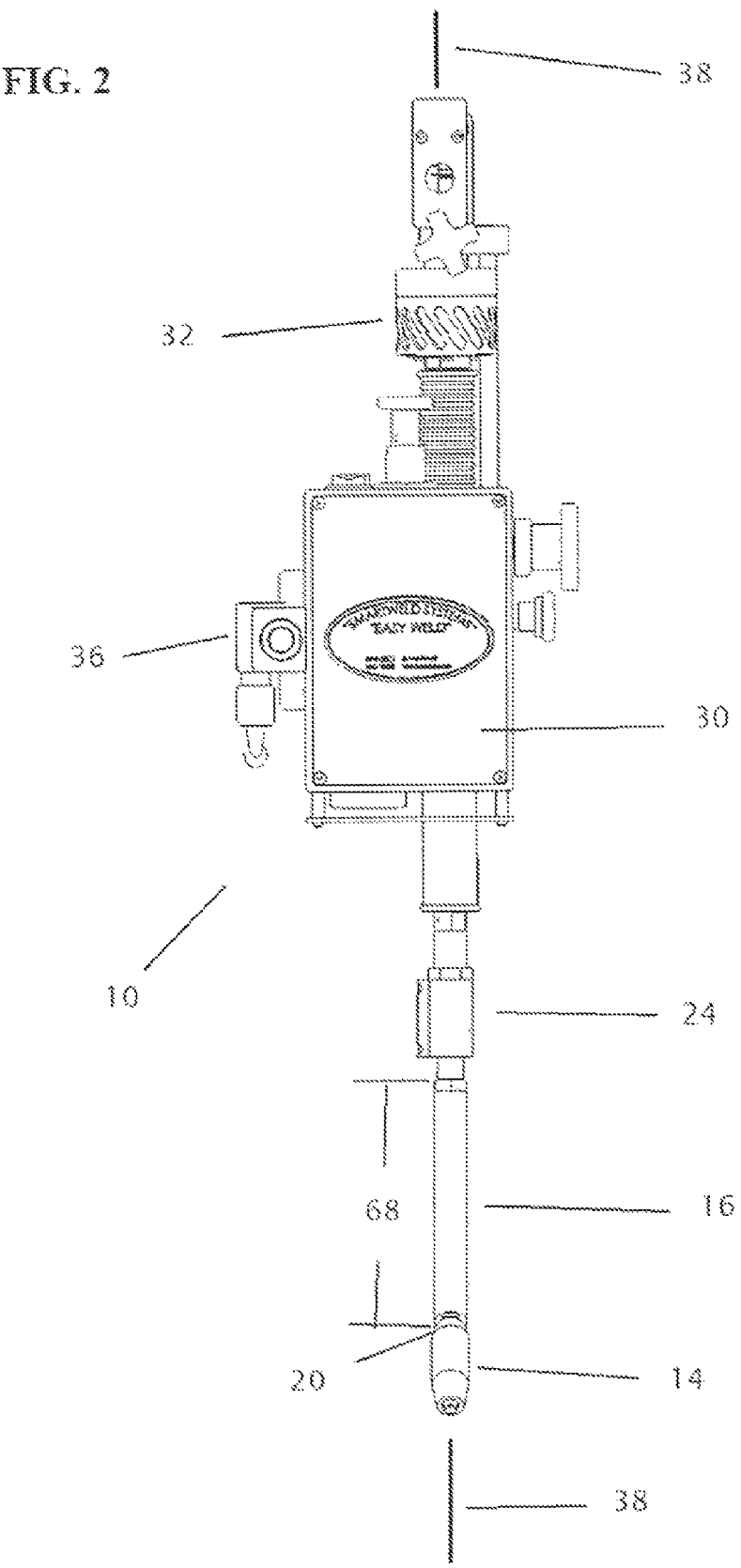
FIG. 2 is a front view of the embodiment of FIG. 1.

Referring now to FIG. 1 and FIG. 2 there is a side view and front view respectively of the invention 10 which is a portable bore welding machine for circular deposition of a weld bead on an inside surface of a bore. The welding machine may operate in a variety of orientations and in FIG. 1 it is shown in a vertical orientation. The machine comprises a torch assembly 12 comprising a torch head 14 attached to a torch head extension tube 16 bottom end 18 by a first adjustable swivel means 20. The first adjustable swivel means permits the swivel movement of the torch head as shown by arrow 22. There is a second adjustable swivel means 24 attached to the torch head extension tube 16 top end 26. The second swivel means permits the extension tube to swivel as shown by arrow 28. By manipulation of the swivels the torch head can be placed in a desired location adjacent to the inside surface of the bore. Within box 30 there is a motor assembly for advancing the torch head linearly into the bore and for rotating the torch head around the inside surface of the bore. While rotating, electrical connection is maintained from a suitable power source to the torch head by an electrical swivel connector 32. The box 30 is mountable to an alignment rod 34 by mounting means 36. The alignment rod ensures that the axis 38 remains co-axial with the axis of the bore. A feed assembly for feeding a consumable welding wire electrode to the torch head and a control assembly for controlling the operation of said welding machine are not shown.

Figure 3:
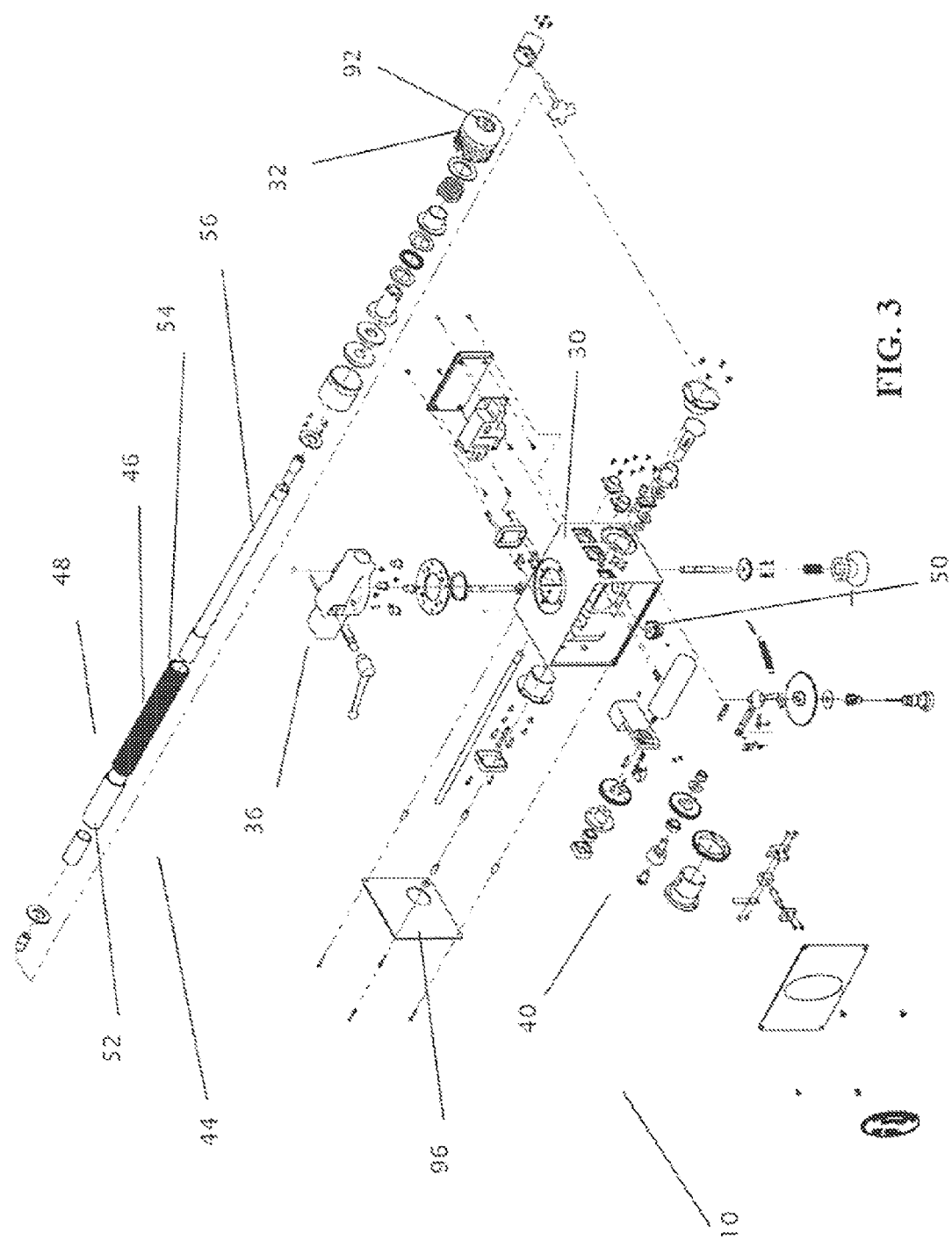
FIG. 3 is a disassembled view of one embodiment of the invention without the feed assembly or electrical connection.

Referring now to FIG. 3 there is shown a disassembled diagram of the invention 10 with the wire electrode feeding means not illustrated. Within the box 30 is the motor assembly 40. The motor assembly comprises an electric motor 42 coupled to a worm drive 44 comprising a worm 46 on a first hollow shaft 48 and a worm gear 50 in meshed engagement with the worm. The hollow shaft 48 has a bottom end 52 coupled to the adjustable swivel assembly 24 and a top end 54 coupled to the electrical swivel assembly 32. The electrical motor 42 moves the torch head 16 axially and rotationally in the bore.

The motor assembly 40 further comprises a second hollow shall 56 within the first hollow shaft 48 for guiding welding wire and an inert gas to the torch head. The motor assembly 40 is contained within box 30. The box is mountable by mounting means 36 to an adjacent co-axial centering rod which is not shown in FIG. 3.

Figure 4:
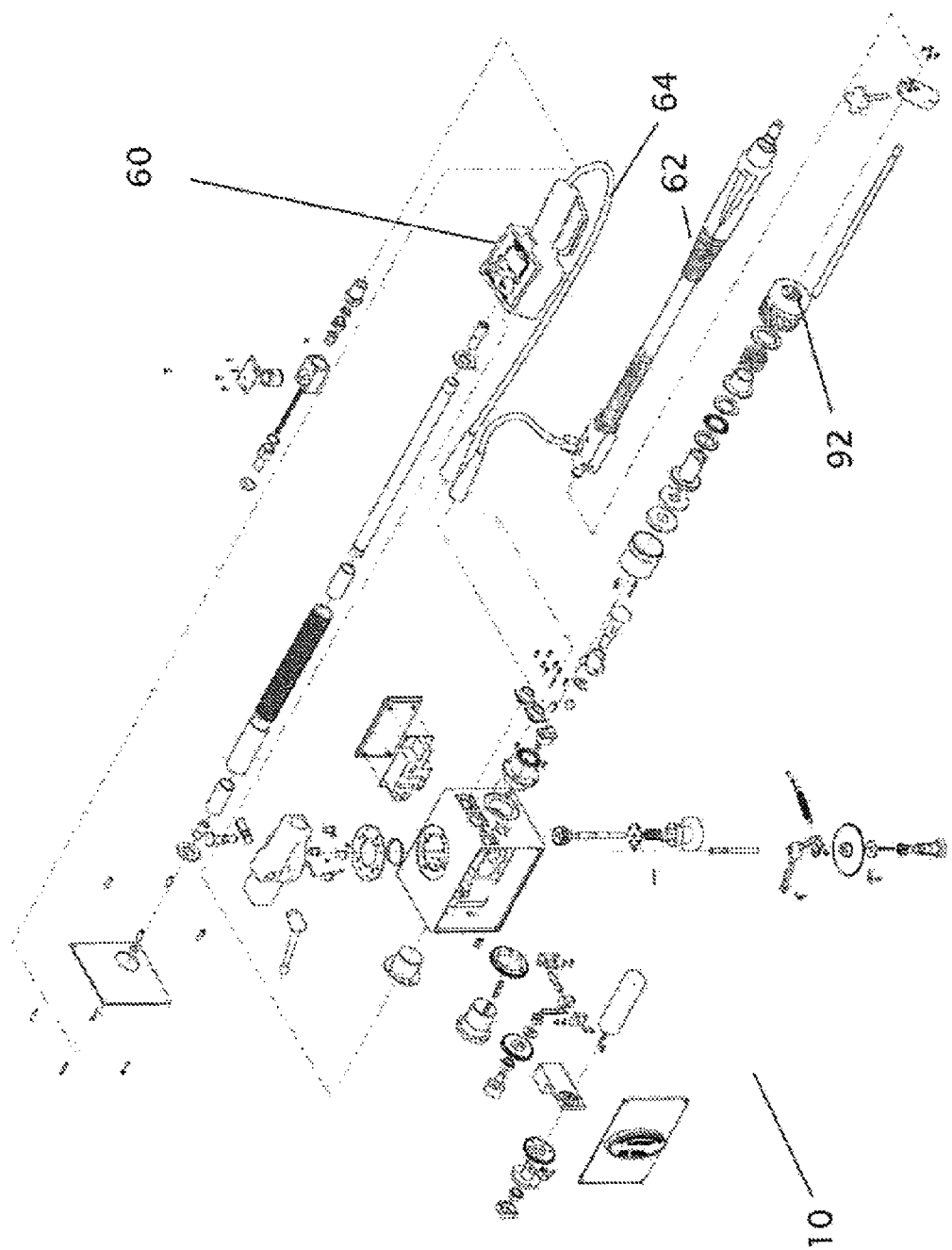
FIG. 4 is a disassembled view of another embodiment of the invention showing the feed assembly and the remote controller.

Referring to FIG. 4 there is shown a disassembled illustration of the invention 10 including the remote control assembly 60 and the welding wire feed assembly 62. The control assembly 60 is remote from the welding machine and operatively connected thereto by a control cable 64. The control assembly automatically sets the rotational speed of the torch head as a function of bore size. The linear speed of the torch head is adjusted by adjustment knob 66 shown in FIG. 1. The control assembly permits an operator to turn the feed assembly 62 on and off.

Referring back to FIG. 2 there is a variable distance 68 between the torch head 14 and the second swivel assembly 24. The variable distance 68 is set by the length of the torch head extension tube. The extension tubes come in a variety of lengths from 2 inches to 15 inches and are adapted to suit the diameter of the bore of the work piece.

Figure 5:
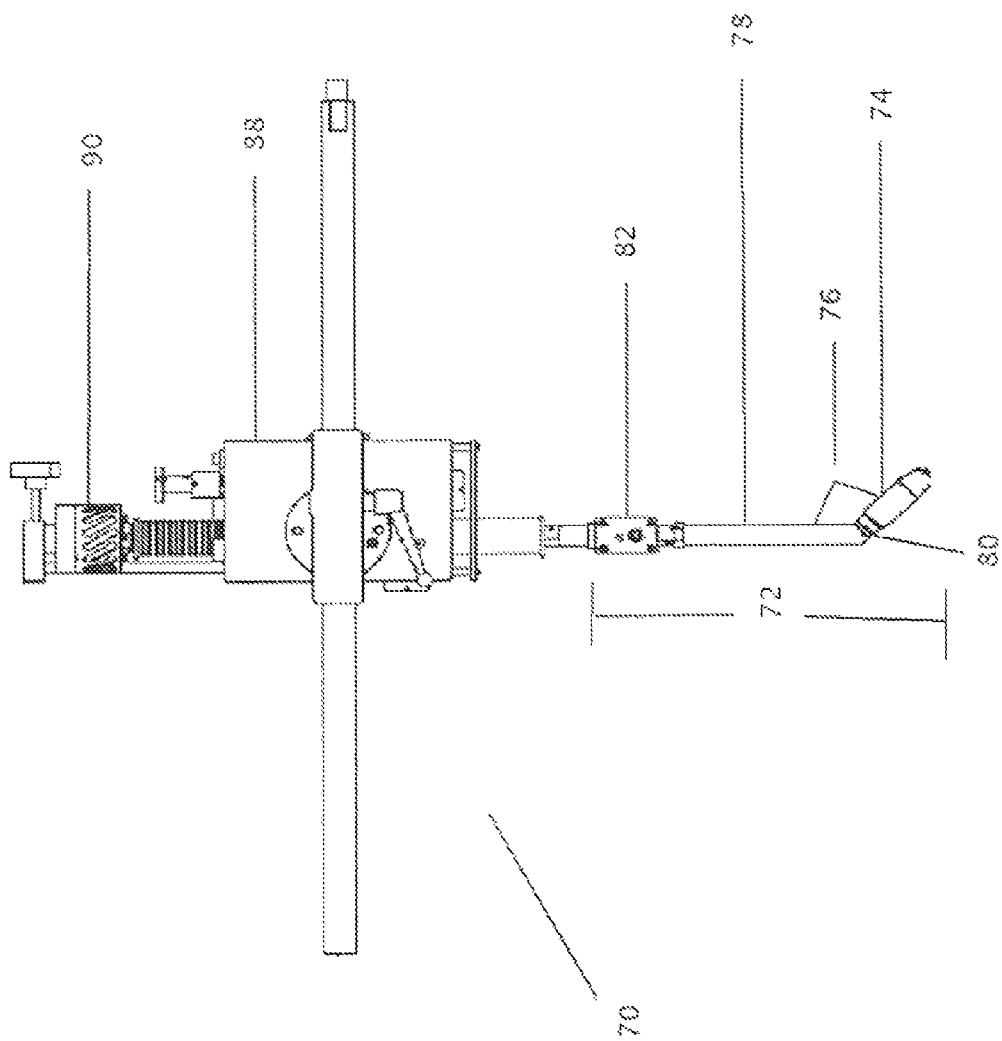
FIG. 5 is a view of another embodiment of the invention in which the torch head is fixed at a predetermined angle.

Referring to FIG. 5 and in another embodiment of the invention a portable bore welding machine 70 for circular deposition of a weld bead on an inside surface of a bore comprises a torch assembly 72 comprising a torch head 74 fixed at a predetermined angle 76 to a torch head extension tube 78 bottom end 80. An adjustable swivel means 82 is attached to the torch head extension tube top end 86 for adjustable placement of the torch head in a desired location adjacent to said inside surface of the bore. An electric motor assembly advances the torch head linearly into the bore and rotates the torch head around the inside surface of the bore is housed in box 88. An electrical connector 90 is provided for establishing electrical connectivity to the torch head as it rotates. The feed assembly for feeding a consumable welding wire to the torch head and a remote control assembly for controlling the operation of said welding machine are similar to the previous embodiment as illustrated in FIGS. 1 to 4.

The electric motor assembly comprises an electric motor coupled to a worm drive comprising a worm on a first hollow shaft and a worm gear in meshed engagement with the worm. The first hollow shaft has a bottom end coupled to the adjustable swivel assembly and a top end coupled to the electrical connector. The electrical motor moves the torch head axially and rotationally in the bore. The electric motor assembly further comprises a second hollow shaft within the first hollow shaft for guiding the welding wire and an inert gas to the torch head. The electrical connector 90 is an electrical swivel assembly and comprises an annulus 92 (FIG. 3) for the insertion of the electrode wire. The wire feed assembly (item 62 in FIG. 4) comprises an elongate hollow tube mounted to die annulus of the electrical swivel assembly.

Referring to FIG. 3 and FIG. 1 there is a heat shield disposed between the torch head 14 and the box 30.

What is claimed is:

1. A portable bore welding machine having automatic step adjustment for circular deposition of a weld bead on an inside surface of a bore, said machine comprising a torch assembly comprising a torch head attached to a torch head extension tube bottom end by a first adjustable swivel assembly for said torch head movement through a first angle relative to said torch head extension tube, a second adjustable swivel assembly for said torch head extension tube movement through a second angle relative to a machine vertical axis attached to the torch head extension tube top end for placing the torch head in a desired location adjacent to said inside surface of the bore, one integral electric motor for advancing the torch head linearly into the bore and for rotating the torch head around said inside surface of the bore, an electrical swivel connector for providing electrical connectivity to the torch head as it rotates, a feed assembly for feeding a consumable welding wire electrode to the torch head and a control assembly for controlling the operation of said welding machine.

2. The welding machine of claim 1 wherein said one integral electric motor is coupled to a worm drive comprising a worm on a first hollow shaft and a worm gear in meshed engagement with said worm, wherein said hollow shaft has a bottom end coupled to said adjustable swivel assembly and a top end coupled to said electrical swivel assembly, and wherein the one integral electrical motor moves the torch head linearly and rotationally in the bore for the circular deposition of weld material.

3. The welding machine of claim 2 wherein one integral motor assembly is contained within a box and said box is mountable to an adjacent co-axial centering adapter.

4. A portable bore welding machine having automatic step adjustment for circular deposition of a weld bead on an inside surface of a bore, said machine comprising a torch assembly comprising a torch head attached to a torch head extension tube bottom end by a first adjustable swivel assembly for said torch head movement through a first angle relative to said torch bead extension tube, a second adjustable swivel assembly for said torch head extension tube movement through a second angle relative to a machine vertical axis attached to the torch head extension tube top end for placing the torch head in a desired location adjacent to said inside surface of the bore, one integral electric motor for advancing the torch head linearly into the bore and for rotating the torch head around said inside surface of the bore, an electrical swivel connector for providing electrical connectivity to the torch had as it rotates, a feed assembly for feeding a consumable welding wire electrode to the torch head and a control assemble for controlling the operation of said welding machine wherein said one integral electric motor is coupled to a worm drive comprising a worm on a first hollow shaft and a worm gear in meshed engagement with said worm, wherein hollow shaft has a bottom end coupled to said adjustable swivel assembly and a top end coupled to said electrical swivel assembly, and wherein the one integral electrical motor moves the torch head linearly and rotationally in the bore for the circular deposition of weld material and wherein the one integral motor assembly is contained within a box and said box is mountable to an adjacent co-axial centering adapter.

* * * * *